United States Patent Office 3,555,369
Patented Jan. 12, 1971

3,555,369
CONDENSER ELECTRODE WITH SEMI-PERMEABLE MEMBRANE SURFACE
Tomiya Yoshino, Saitama-ken, Japan, assignor to Towa Chikudenki Kabushiki Kaisha, Kanagawa-ken, Japan, and Tokyo Denki Kabushiki Kaisha, Yamagata-ken, Japan
Continuation-in-part of application Ser. No. 451,207, Apr. 27, 1965. This application Jan. 6, 1969, Ser. No. 795,395
Claims priority, application Japan, May 20, 1964, 39/28,111
Int. Cl. H01g 3/11, 9/00
U.S. Cl. 317—230    26 Claims

ABSTRACT OF THE DISCLOSURE

The new electrode plate includes an electrode base having on its surface a very thin, liquid absorbing, semipermeable membrane. The semipermeable membrane is composed of one or more films formed at least one of the following materials: a water soluble, high molecular weight, organic compound; a mixture thereof; an organo-silicon compound; a mixture of any of the foregoing with an ion exchange material or a mixture of a water insoluble high molecular weight organic compound and an ion exchange material. Preferably, the membrane is obtained by applying to the base a solution of the film forming material which is dried to leave the semipermeable membrane coating. By means of the present membrane-coated electrode plate, a light, compact and efficient capacitor is obtained which has a high electrostatic capacity per unit area.

---

This application is a continuation-in-part of my U.S. application Ser. No. 451,207 filed Apr. 27, 1965, now abandoned.

BACKGROUND OF THE INVENTION

This invention relates to an improved electrode plate for a capacitor. In particular, this invention concerns an electrode plate having on its base a thin semipermeable membrane.

The electrode of this invention is useful not only for an electrolytic capacitor or condenser but also for any other type of condenser. However, particularly excellent results are obtained when the electrode plate of this invention is used in an electrolytic capacitor.

The foil type of electrolytic capacitor which has a foil of aluminum, tantalum, titanium, niobium or some other metal is well known. The foil, which has a positive oxide film on its surface to make it a dielectric and the other electrode separated by an insulator are wrapped together in the condenser or capacitor. Kraft paper is commonly used for insulation and separation between the electrodes in this type of electrolytic condenser and also for storing the electrolyte. The use of this paper prevents the occurrence of difficulties such as dielectric breakdown and also holds the electrolyte among the paper fibers, through the mesh of which the electrolyte moves.

Such kraft paper must be thick enough to maintain adequate resistance against voltage to avert dielectric breakdown. Generally the thickness of kraft paper is required to be equal to or more than that of the metal foil for the electrode, and since the condenser element is constructed by inserting at least one sheet of kraft paper between the metal foils which constitute the positive and negative electrodes, the element is of necessity rather large.

SUMMARY OF THE INVENTION

The object of this invention is to provide a new electrode plate for a capacitor whereby the size of the complete capacitor is substantially reduced. Another object of the present invention is the provision of an electrode plate having improved properties, including improved voltage resistance and coefficient or loss.

A further object of this invention is the provision of an electrode plate wherein intervening material such as kraft paper, between the electrodes of a capacitor may be avoided.

A still further object of the present invention is the provision of an electrode plate which when assembled in an electrolytic capacitor results in a electrolytic capacitor with improved properties.

A still further object of the present invention is to provide an electrode plate having highly desirable properties and by means of which it is possible to manufacture a compact capacitor very simply and economically.

The electrode plate of this invention is comprised of a base which constitutes the electrode and a thin, liquid-absorbing, semipermeable membrane provided on the surface of the base.

Furthermore, this invention provides the condenser element which constitutes the above-mentioned electrode plate and the condenser having such element.

According to the present invention a liquid absorbing thin semipermeable membrane is placed between two opposing electrode plates. This arrangement contributes to the reduction of the size of the condenser element, and at the same time enhances and improves the properties of the condenser.

DESCRIPTION OF THE PREFERRED EMBODIMENTS

Figure 1:
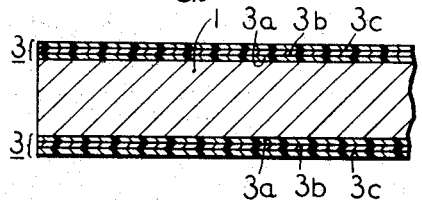
FIGS. 1 through 7 are enlarged vertical sections of a part of the electrode plate coated with a semipermeable membrane in accordance with this invention.

The term "liquid-absorbing" is to be interpreted in a broad sense, including water absorbing and hygroscopic properties.

The semipermeable membrane used for this purpose is made of certain organic semipermeable matter either singly or in combination with some other substance, or of a certain inorganic matter. The membrane is exceedingly thin; i.e. of a thickness of about $0.1$–$40\mu$, preferably below $40\mu$, and most preferably of the order of $0.2$ to $1$ or $2\mu$. If this membrane is placed, for example, an the side of the positive or negative electrode, or on both sides, or between the electrodes, and the electrodes and the membrane are wound or folded in a zigzag manner so as to construct the element, the size of the element and the diameter of winding are determined almost solely by the thickness of both metal foils. Accordingly, a given electrostatic capacity can be obtained from an exceedingly small element compared with a conventional element. Since electrostatic capacity is increased by the use of this semipermeable membrane, a remarkably larger electrostatic capacity can be had with an element of identical size. Another advantage of this invention is that the coefficient of loss is lowered as the interval between the electrodes is reduced.

The semipermeable membrane of this invention which is to be used in the aforementioned type of capacitor is also required to have such properties as high voltage resistance and an adequate liquid-absorbing property sufficient to enable the membrane to absorb and hold the electrolyte, and to permit free passage of ions through the membrane to reinforce the dielectric when the membrane permeated with the electrolyte is charged with electricity, since the dielectric is the positive oxide film which is chemically made from the metal foil. Another requirement of the semipermeable membrane is that no decomposition or corrosion takes place even if it is subjected to a temperature as high as 60°–80° C. for a long period of time.

In accordance with this invention, semipermeable membranes with properties that meet the above requirements are obtained by the use of films of certain high molecular weight, i.e. polymeric compounds.

It has been found that films formed from at least one of the following types of materials yields a liquid absorbing semipermeable membrane with the desired properties; a water soluble high molecular weight organic compound and mixtures thereof, polymeric organosilicon compounds, mixtures of the foregoing with an ion exchange substance, and mixtures of water insoluble, high molecular weight organic compounds and an ion exchange substance.

Water soluble, high molecular weight organic compounds which are used in the present process to form highly water absorbent, semipermeable membranes on an electrode plate include, polyvinyl alcohol, polyethylene oxide, methyl cellulose having a methylation degree of about 1.6 to 2.0 and gelatin. These materials can be used alone or in combination. Further, they can be applied to the electrode plate as a mixture in a solution, or two or more of these materials can be applied as successive separate films to form the final semipermeable membrane.

In combination with one or more films formed from water soluble, high molecular weight organic polymers, the semipermeable membrane of this invention may also contain a film formed from a high molecular weight, water insoluble organic compound, such as films formed from water insoluble cellulose derivatives including nitrocellulose, methyl cellulose having a methylation degree of 2.4 to 2.8, alkali cellulose and acetyl cellulose and such synthetic polymers as polyvinyl chloride, acrylonitrile and vinyl chloride-acrylonitrile copolymer.

Mixtures of water soluble polymers and water insoluble polymers may also be used to form the present semipermeable membrane.

A polyalkoxy silane originating from compounds of the type $R_nSi(OR')_{4-n}$ in which R and R' represent alkyl groups and $n$ is 0 to 3, and an organopolysiloxane having a general formula

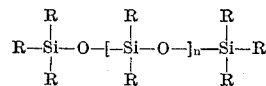

in which R is alkyl group, and $n$ is an integer may be mentioned as the organosilicon compounds used to form the semipermeable membrane of this invention.

Some specific examples of the materials used to form the polymeric organosilicon membrane of this invention include dimethyldiethoxysilane, dimethylacetoxysilane, trimethylsilane, diphenyldimethylsilane, nitroxytrimethylsilane, hexamethyldisilane, tetramethylsilicate, tetraethylsilicate, tetra-n-propylsilicate, dimethylpolysiloxane, diphenylpolysiloxane etc. The silicone content of these compounds is approximately 10–70%, and the most desirable percentage is approximately 38–42% which gives the best performance of the membrane and enhances the efficiency of the condenser.

Thus, the electrode plate of the present invention may be manufactured by spreading a solution of an alkyl polysilicate, such as ethyl polysilicate, $[Si(OC_2H_5)]_n$ in an organic solvent over the surface of the base to form a membrane, which is heated to produce an organosilicon polymer of a bridged network construction. Membranes made of such organosilicon compounds have a strong fixing power with respect to the base, especially metal foil, and also a high liquid absorbing property. A membrane formed from an organosilicon polymer and then saturated with liquid has a lower electric resistance, which in turn means that it does not serve as a perfect insulator but maintains adequate semipermeability as desired. Organosilicon compounds may be blended with other organic semipermeable substances such as polyvinyl alcohol, polyethylene oxide, gelatin and cellulose derivatives, preferably with the organosilicon compounds amounting to more than 5%. Further, a membrane of organosilicon compounds may be laminated with other organosemipermeable films including films of water soluble and/or water insoluble high molecular weight organic compounds. When organosilicon compounds are included in the semipermeable film of this invention, the overall thickness of the semipermeable membrane may be as small as $0.5\mu$ or even $0.1\mu$.

Consequently, when the electrolytic capacitor of this invention is fabricated using an electrode plate which is equipped with a semipermeable membrane containing an organosilicon compound, the membrane may be particularly thin and, accordingly, the condenser may be especially compact.

Other metals in addition to silicon, such as boron, titanium, aluminum, and germanium may also coexist in the bridged network construction of the semipermeable film formed on the electrode plate.

According to this invention, a capacitor element is produced using at least one electrode plate which has been coated with a semipermeable membrane as described herein. The electrodes are wound or folded together with the semipermeable membrane placed therebetween, so that the semipermeable membrane acts as the spacer or insulating material. When the element is permeated with electrolyte, connected to terminals, housed and sealed in a case, the electrolytic capacitor of this invention is produced, which is smaller and lighter than any other existing electrolytic capacitor and in addition has exceedingly desirable properties which will be described in greater detail below.

The semipermeable membrane can be formed easily on an electrode base by applying a solution of one or more of the materials used therefor in accordance with this invention to the metal foil which is to be used as an electrode. The solution may be applied to both sides or only one side of the metal foil by any simple means, such as spraying, painting or immersion, after which the solution is dried. The semipermeable membrane may be formed by a single application of a solution of one or more materials, or the semipermeable membrane may be a lamination composed of two or more layers of the materials used to make the present semipermeable membrane. In addition to a solution, the materials may also be used in other liquid forms such as an emulsion, suspension or dispersion. It is also possible to form the semipermeable membrane by spreading the material on the surface of the base or by forming the membrane independently and then laminating this independent membrane to the electrode base.

According to another aspect of this invention, the electrode plate may be coated with an ionic semipermeable membrane. The formation of an ionic-type membrane on an electrode may be accomplished by painting a blend of pulverized or liquidized ion-exchange substance such as an ion-exchange resin with one or more of the above mentioned polymeric materials on the surface of the base or by spraying a solution of ion exchange resin on the semipermeable membrane already formed on the base, or by immersing the membrane formed on the base in a solution of ion-exchange resin so that the resin is absorbed. The ionic, semipermeable membrane coating is then dried in the usual manner.

Ionic semipermeable membranes of the present invention may be formed by combining an ion-exchange material with either a water soluble high molecular weight organic material, an organosilicon compound, a water insoluble high molecular weight organic material, or combination thereof, particularly the specific water soluble film forming polymers, organosilicon compounds and water insoluble organic polymers mentioned above.

In an electrolytic capacitor which employs an electrode plate coated with an ionic-type of semipermeable membrane, the movement of the ions in the electrolyte is exceptionally fast. Therefore, the processes of permeating the condenser element with electrolyte, supplying voltage between the positive and negative electrodes and minimizing leakage current by means of the so called aging operation, are accomplished in a short period of time due to the excellent mobility of the ions. For example, an operation which requires 60 minutes using an element comprising an electrode plate wherein a non-ionic organic semipermeable membrane is employed, requires only 20 minutes when an ionic-type membrane is used; the actual time varies of course depending on the type of electrolyte used. However, the high speed of this operation is another advantage of the present invention.

As examples of ion-exchange resin used in the present semipermeable membranes may be mentioned sulfonated polystyrene, polyvinyl methyl pyridinium bromide, vinyl methyl ether-maleic anhydride copolymer, pyridine and mixtures thereof, which are anion series substances having a quaternary pyridium group, and cation series substances having the sulfonic group and the carbonic group.

As for the compounding ratio between the ion exchange substance and the above mentioned organic semipermeable matter, (I) a finely divided powder of ion-exchange materials in respective percentages of less than about 50% for strong selectivity and less than about 70% for weak selectivity, is mixed by agitation with the solution of the above mentioned organic semipermeable matter, or (II) the solution of less than 30% solid ion-exchange substance in an organic solvent is mixed with the above stated solution of organic semipermeable matter at such a ratio that the former does not exceed 50%. Any of these solutions is spread over the base by spraying or immersion, or the organic semipermeable membrane formed on the base is immersed in a solution of less than 30% ion-exchange substance so that the membrane may absorb the ion-exchange substance, after which the ionic semipermeable membrane is dried. The lower limit of the compounding ratio of ion-exchange substance to organic semipermeable matter is determined by the extent to which the above objective can be achieved. However, it is experimentally confirmed that desired effects can be substantially accomplished by the use of at least about 10% ion-exchange material, and that adequate performance is achieved by the ionic semipermeable membrane with the thickness of $0.2\mu$.

The semipermeable membranes of this invention are very advantageous for capacitors, due to their high permeability with respect to the electrolyte, which results from the high absorption property with respect to water or solution. Further, the semipermeable membrane is flexible and maintains a suitable conductive property over a long period of time. The capacitor of this invention which is obtained by using at least one electrode plate which has been coated with a thin semipermeable membrane as presently disclosed, is exceedingly compact, since the thin semipermeable membrane acts as the sole spacer or insulator between the positive and negative electrodes. Further, the capacitors have a high electrostatic capacity, low coefficient of loss, low leakage of current, reduced aging time, withstand high voltage well, and are very durable under high voltage.

Inorganic materials may also be used in the present semipermeable membrane.

Among inorganic semipermeable substances which are harmless for the present capacitors are the oxides of various amphoteric elements, such as $Al_2O_3$, $TiO_2$, $SnO_2$, all of which are obtained in powder form, and are used as suspensions in the solution of organic semipermeable substance.

For example, if 5 parts of $Al_2O_3$ powder is mixed with 100 parts of 3% polyvinyl alcohol water solution and the resultant dispersion is spread on the base and dried to form a membrane, an electrode plate is obtained with a membrane which is not only semipermeable but also excellent in its electrical insulation resistance.

The following examples wherein the figures are described in greater detail are illustrative of the best mode contemplated for carrying out the present invention; however, these examples must not be considered as limiting the scope of the invention in any manner whatsoever.

EXAMPLE 1

Electrode plate coated with a membrane composed of successive layers of polyvinyl alcohol, nitrocellulose and polyvinyl alcohol:

Reference is made to FIG. 1. The figure shows a greatly enlarged section of the electrode plate of this invention. Proportions of the parts are not necessarily exact under the limitations of drawing and for convenience of explanation. (This applies to the following drawings, too.)

For the base which constitutes the electrode plate, an aluminum etching foil 1, $60\mu$ in thickness is used. The foil is coated with a $0.3\mu$ thick layer of 1% PVA (polyvinyl alcohol) water solution, which is heated and dried at 50°–100° C. for 5 minutes either by infrared irradiation or by heating in the electric furnace so that PVA film 3a is formed. One coat suffices, but good results are obtained if two or three coats are made with reduced concentration of the solution. The film is further coated with a $0.3\mu$ thick layer of a solution of 1.5% nitrocellulose in ethanol-ether, which is heated and dried in the same manner as above so that nitrocellulose film 3b is formed. A further coating is made with 2% PVA water solution in a thickness of $0.5\mu$, which is heated and dried similarly, to form the PVA film 3c. Thus, the organic semipermeable membrane 3 which is about $1\mu$ thick is formed on the foil 1, when the electrode plate of this invention is obtained.

The optimum degree of polymerization for the PVA used in this process is approximately 400–2500. "Poval 205" (a trade name of Kurashiki Rayon Co., Japan), has been used in this example.

For the base, not only aluminum foil but also foils of titanium, tantalum, niobium, and other metals may be used, and it is also possible to use any of the above metals, plated or vacuum-metalized on a base such as paper.

The drawing shows a base on which the semipermeable membrane is formed on both sides of the foil, but the membrane may be formed only on one side depending on how the electrode plate is to be used, i.e., flat or folded in a zigzag manner, and so forth. (Illustration omitted.)

EXAMPLE 2

Figure 2:
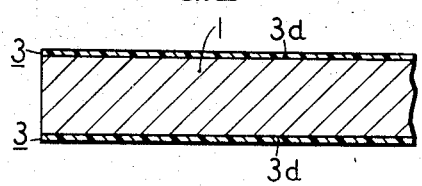

Electrode plate coated with a membrane composed of a mixture of polyvinyl alcohol and gelatin:

With reference to FIG. 2, a hot water solution composed of equal amounts of 6% gelatin and 3% PVA is spread and dried on the foil 1 to form the film 3d, which is immersed in 20% Formalin water solution, rinsed with water, and dried as described in Example 1 to form the organic semipermeable membrane 3.

Desirable membranes have been formed using gelatin, PVA mixtures wherein the compounding ratio of gelatin and PVA is 10:90–90:10.

These mixtures may also be replaced by the use of polyvinyl alcohol above as well as by gelatin above.

EXAMPLE 3

Figure 3:
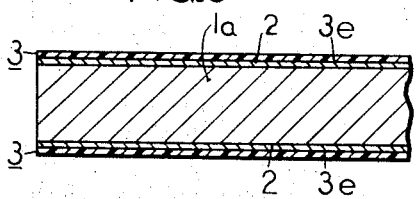

Electrode plate coated with a membrane composed of polyvinyl alcohol and an ion exchange substance:

With reference to FIG. 3, a 60μ thick aluminum etching foil is subjected to positive oxidation in 3% ammonium borate water solution at 14 v. for 20 minutes, rinsed with water, and then dried at about 100°–200° C. The resultant base is used as the positive foil 1a, which is coated with an oxidized film 2.

An ion-exchange resin which is made by sulfonation of polystyrene having an average polymerization degree of 30,000–70,000 is pulverized into a fine powder of 200–350 mesh, and is then mixed in suspension at 10% by weight with a 3% PVA water solution. The resultant solution is employed for coating the above mentioned positive foil by immersion, after which the foil is dried in accordance with the procedure of Example 1. The electrode plate equipped with the ionic organic semipermeable membrane 3 which consists of a 1μ thick film 3e is thereby produced.

The sulfonated polystyrene in film 3e may be replaced by polyvinyl pyridinium bromide or vinyl methyl ether-maleic anhydride copolymer.

EXAMPLE 4

Figure 4:
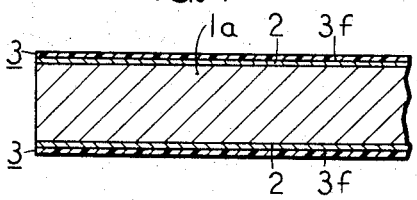

Electrode plate coated with a membrane composed of an ion exchange resin and either collodion or a vinyl chloride-acrylonitrile copolymer:

With reference to FIG. 4, the positive electrode plate 1a which is the same as that described the organic semipermeable membrane 3, which consists of the film 3f made from the equivalent compound solution which comprises the 10% polystyrene sulfonic acid ethanol solution and solution of 2% collodion in a mixture of ethanol-ether solvent with the other procedures same as Example 3. Satisfactory results are obtained when the above two solutions are compounded at the approximate ratio of 5:95. It is to be added that the above collodion solution may be replaced by Dinel (a trade name of Carbide and Carbon Chemical Co., U.S.A.), which is a copolymer consisting of 60% vinyl chloride and 40% acrylonitrile.

Good results are obtainable also if the organic semipermeable membrane is formed on the base by the use of PVA in the method in the above examples, and then the above mentioned film 3f is applied on said membrane by immersion or any other method.

EXAMPLE 5

Figure 5:
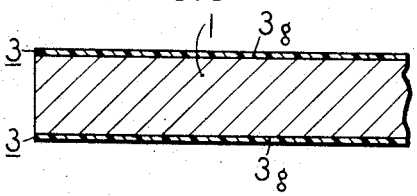

Electrode plate coated with a membrance composed of an alkyl polysilicate:

With reference to FIG. 5, the base is coated with the semipermeable membrane 3 of organosilicon compounds. This membrane consists of the film 3g (0.1μ in thickness) which is constituted by a network bridging construction of silicon oxide produced by spreading an ethanol solution of ethyl polysilicate with viscosity 7 cp. over the foil 1, which is then heated and dried, in accordance with procedure described in Example 1.

Ethyl polysilicate may be replaced in this membrane by dimethyl polysiloxane.

EXAMPLE 6

Figure 6:
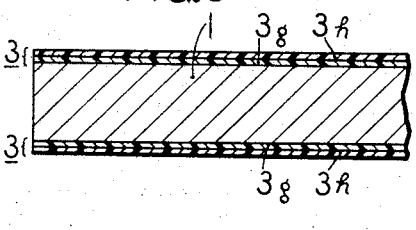

Electrode plate coated with a membrane composed of successive layers of polsiloxane and polyvinyl alcohol:

FIG. 6 shows the electrode plate which is fabricated in the manner described in Example 1 except that the semipermeable membrane 3 consisting of a 0.3μ thick film 3h of 2% PVA and the underlying polysilicate film 3g applied as described in Example 5.

Good results are obtained when the concentration of the ethyl polysilicate solution is about 2–15 cp. and the thickness of the membrane is 0.1–0.3μ.

The above ethyl polysilicate may be replaced by dimethyl polysiloxane or methyl polysilicate. Also, the above polyvinyl alcohol may be replaced by methyl cellulose having a methylation degree of 1.6–2.0.

EXAMPLE 7

Figure 7:
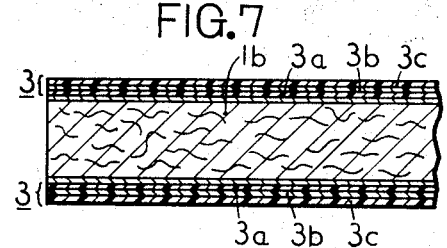

Electrode plate based on aluminum plated kraft paper coated with a membrane of polyvinyl chloride, nitrocellulose and polyvinyl alcohol:

FIG. 7 shows the electrode plate which is coated with a membrane which is the same as that of Example 1; however in this example the base 1 is made of 40μ kraft paper, the surface of which, 1b, is plated with aluminum by a method such as vacuum metalizing. The successive layers of polyvinyl alcohol, nitrocellulose and polyvinyl alcohol are applied as described in Example 1.

This electrode plate is used in the same manner as that of Example 1.

EXAMPLE 8

Capacitor containing electrode plate of Example 1:

The electrode plate shown in Example 1 is cut to 15 mm. in length and 300 mm. in width and used as the negative foil.

For the positive foil, a 60μ thick aluminum etching foil is subjected to positive oxidation in an ammonium borate water solution at 50 v. to form an oxide film 2 for the dielectric layer, which is cut to the same dimensions as the above mentioned negative foil, with terminals attached, and the negative and positive foils are coiled overlapping each other so that the condenser element may be constructed. This element is permeated with the electrolyte by the regular method before it is put in a case and sealed, when the condenser is completed.

Figure 8:
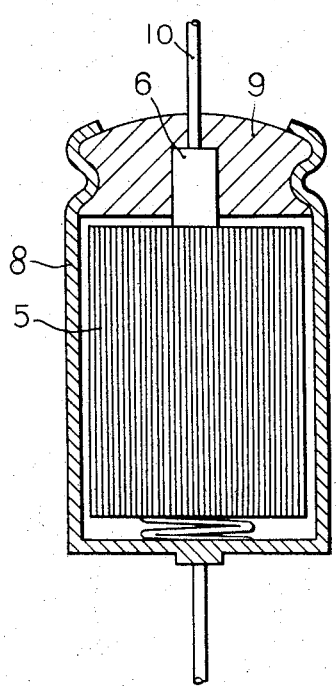
FIGS. 8 and 9 are enlarged vertical sections ol electrolytic capacitors of this invention which are equipped with a membrane coated electrode plate as described above.

FIG. 8 shows the above-described electrolytic condenser or capacitor. The element 5 is enclosed in the case 8. The outlets of the positive and negative electrodes 6 and 7 are connected respectively to the lead wires 10 and 11 and the seal packing 9 seals the opening in the case 8.

Figure 10:
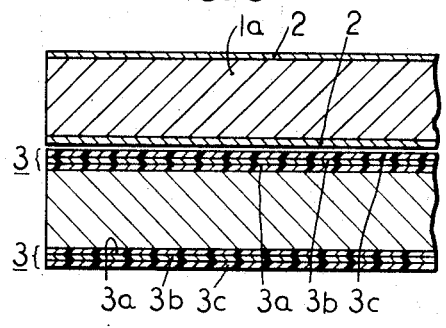
FIGS. 10 and 11 are enlarged vertical sections of the positive and negative electrode plates used in the elements of the capacitors of this invention.

Parts of the electrode plate in the above described element is greatly enlarged in FIG. 10. For contrast, an enlargement of part of the electrode plate of the commercial electrolytic condenser using kraft paper is shown in FIG. 12.

Figure 12:
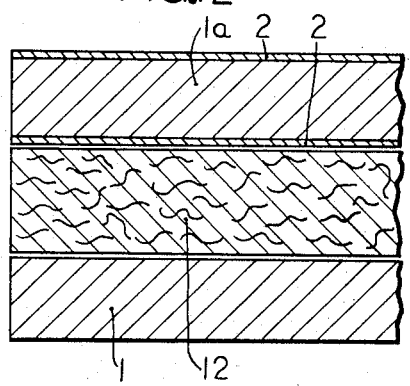
FIG. 12 which is given by way of contrast is an enlarged vertical section of a known positive and negative electrode plate separated by kraft paper.

In FIG. 12, the kraft paper 12 separates the negative and positive plates 1 and 1a respectively. The positive plate 1a is coated with an oxide film 2.

The following table gives a comparison between the electrolytic condenser of this invention and the conventonal condenser using kraft paper.

TABLE 1

| Designation | Electrostatic capacity, μf. | Coefficient of loss (tan δ) percent | Leakage current (25v.)μa. | Dimensions of condenser | |
|---|---|---|---|---|---|
| | | | | Diameter, mm. | Length, mm. |
| Condenser of this invention | 250 | 3 | 0.1 | 10 | 18 |
| Contrast condenser | 200 | 15 | 1.0 | 15 | 25 |

As shown above, the electrolytic condenser of this invention has a small size, which is a fraction of that of the contrast condenser. It has been proved by tests that the condenser of this invention can withstand a voltage of 35 v. and shows no abnormalities, such as the increase of leakage current, short circuit, etc. under a continuous voltage at 65° C. for 1000 hours. Among other advantages, the thinness of the semipermeable membrane is specially conducive to improvement in the coefficient of loss (tan δ), one of the important electrical properties.

Moreover, whereas the above electrode plate is cut after the semipermeable membrane is formed on the foil, the same article is also obtained if the semipermeable membrane is provided after the electrode plate is cut to specified dimensions and equipped with terminals.

EXAMPLE 9

Capacitor containing electrode plate of Example 2:

In this example, the electrolytic condenser of this invention can be obtained in the same manner as Example 8, except that the negative foil prepared according to Example 2 is used, the positive foil is treated at 14 v. and the dimensions of the foil are 5 mm. in length and 70 mm. in width.

This condenser is very small in size, 5.5 mm. in diameter and 9 mm. in length, and as for its electric properties, the electrostatic capacity is 60 μf, the coefficient of loss is 4%, the leakage current at 6 v. is 0.1 μa. and the other properties are the same as the capacitor of Example 8.

EXAMPLE 10

Capacitor containing electrode plate of Example 3:

The electrolytic condenser of this invention is the same as Example 8, except that the positive foil obtained according to Example 3 is used, and the dimensions of the negative and positive foils are 7 mm. long and 80 wide (the thickness of the negative electrode is 60μ).

Figure 11:
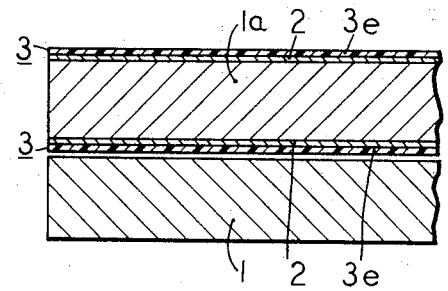

FIG. 11 shows an enlargement of part of the electrode plate of the above mentioned element, which is provided on the positive side with the semipermeable membrane 3.

The dimensions of this condenser are 6 mm. in diameter and 11 mm. in length, much smaller than previous capacitors and the mobility of ions of the electrolyte in the semipermeable membrane is good and the aging operation are accompanied within fifteen minutes. The electrostatic capacity is 100 μf., the coefficient of loss is 4%, the leakage current at 10 v. is 0.1 μa., and the other properties are the same as those of the capacitor of Example 8.

EXAMPLE 11

Capacitor containing the electrode plate of Example 4:

This capacitor is constructed in the same manner as described in Example 10 except that the positive foil of Example 4 is used. The capacitor has substantially the same properties as the capacitor of Example 10.

EXAMPLE 12

Capacitor containing the electrode plate of Example 5:

This capacitor is constructed in the manner described in Example 1, except that the foil is as thick as the negative foil of Example 5, that the positive foil is made chemically in the same manner as the preceding example at 30 v., and that the dimensions of the positive and negative foils are 5 mm. in length and 170 mm. in width.

This condenser, 8 mm. in diameter and 9 mm. in length, has the following properties: the electrostatic capacity is 80 μf., the coefficient of loss is 3%, the leakage current at 10 v. is 0.1 μa., and the condenser withstands the voltage of 24 v., showing no abnormal conditions under the continuous voltage of 10 v. at 85° C. for 1000 hours.

EXAMPLE 13

Capacitor containing the electrode plate of Example 6:

This capacitor is constructed in the manner described in Example 12, except that the negative foil of Example 6 is used and that the coefficient of loss is improved to 2.5%.

Figure 13A:
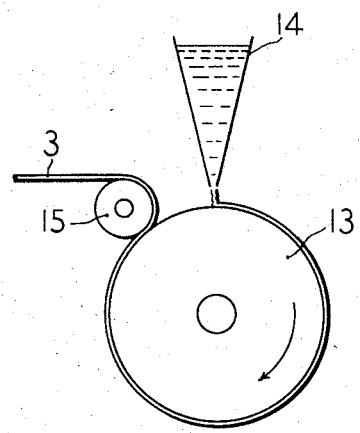
FIGS. 13a and b are diagrams of equipment which can be used to manufacture a semipermeable membrane.
Figure 13B:
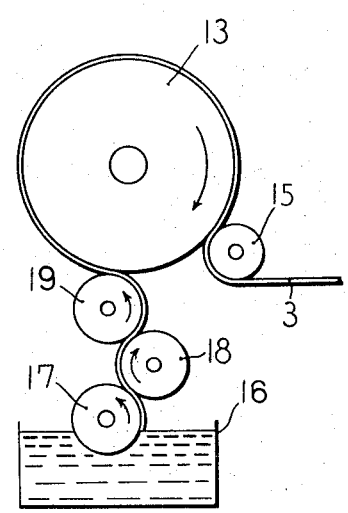

The semipermeable membrane that constitutes part of the electrode plate may be an independent piece of film, as described below, which is laminated with the foil. FIG. 13a is a sketch diagram of the simple manufacturing equipment of the film. The heating drum 13, heads the liquid fed from the hopper 14. The hopper 14 contains a solution of the material to be used to form the semipermeable membrane for example, a PVA solution with a concentration of about 0.3%. The semipermeable membrane 3, which is formed on the drum 13, is wound by the taking-up roller via the guide roller 15. FIG. 13b is a sketch diagram of another type of manufacturing equipment, wherein the solution tank 16 contains the solution of material used to form the semipermeable membrane. The solution is picked up on the feed roller 17 and advanced by way of the intermediate roller 18 and fed to the coating roller 19 from which it is transferred to the heating drum 13 where the semipermeable membrane 3 is formed. The membrane 3 is then wound via the guide roller 13. The thickness of the semipermeable membrane can be adjusted by the rotating speed of the heating drum, the concentration of the solution, and so forth.

In addition, concerning any of the preceding examples, the desired electrode plate and the electrolytic condenser may be obtained if the metal foil previously cut to the specified dimensions is provided with terminals and subjected or not subjected to positive oxidation before being put through the process of forming the semipermeable membrane.

The foregoing is a description of polar electrolytic condensers, but this invention enables the application of the condenser for AC uses, if the negative side is subjected to positive oxidation in the same manner as described in the foregoing examples, and both the negative and positive electrode plates are equipped with a dielectric layer. In addition, this invention may be embodied in various types of electrolytic condensers.

Figure 9:
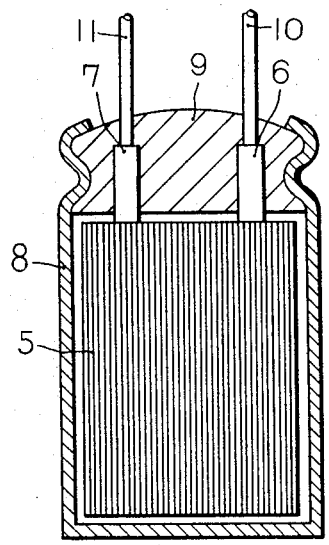

Another example of a capacitor of this invention is shown in FIG. 9, in which the negative and positive lead wires are pulled out in the same direction, and the other points are the same as in FIG. 8.

This invention greatly reduces the size of the condenser by providing the semi-permeable membrane on metal foil or some other base that constitutes the electrode, with the result that a light and efficient condenser can be easily and simply obtained without need of an experienced technician.

On the other hand, since the oxide film which is made of aluminum or some other metal through positive oxidation has a high dielectric constant, the electrostatic capacity per unit area is great, and it is confirmed that this capacity is further increased by this invention.

Other examples of embodiments of this invention, which have been omitted for the conciseness of our explanation, can be obtained easily by combining the foregoing examples and the description of the present specification. It may be readily understood that a variety of modifications will be achieved without deviating from the scope of this invention, and that other matters already known or to be known in the future will be used as adequate materials for this invention.

What I claim and desire to secure by Letters Patent is:

1. An electrode plate for a capacitor comprising a base which constitutes the electrode and a very thin semipermeable and liquid absorbing membrane on the surface of said base, said membrane consisting essentially of at least one film-forming substance selected from the group which consists of
   (1) water soluble high molecular weight organic material selected from the group consisting of polyvinyl alcohol, polyethylene oxide, methyl cellulose having a methylation degree of 1.6 to 2.0, gelatin and mixtures thereof;
   (2) organosilicon compound selected from the group consisting of polyalkoxy silane, organopolysiloxane and mixtures thereof;

(3) a combination of a water insoluble high molecular weight organic material selected from a member of the group consisting of nitrocellulose, methyl cellulose having a methylation degree of 2.4 to 2.8, alkali cellulose, acetyl cellulose, polyvinyl chloride, polyacrylonitrile, vinyl, chlorideacrylonitrile copolymer and mixtures thereof and at least one member selected from the group consisting of said organosilicon compound and said water soluble high molecular weight compound;

(4) a combination of an ion-exchange material and at least one member of the group consisting of said water soluble high molecular weight material, said organosilicon compound and said water insoluble high molecular weight polymer.

2. An electrode plate according to claim 1 in which said ion exchange material is selected from the group consisting of sulfonated polystyrene, polyvinyl methyl pyridinium bromide, vinyl methyl ether-maleic anhydride copolymer, pyridine and mixtures thereof, which are anion series substances having a quaternary pyridinium group, and cation series substances having the sulfonic group and the carbonic group.

3. An electrode plate according to claim 1 in which said semipermeable membrane consists essentially of a dried aqueous solution of said water soluble high molecular weight organic compound.

4. An electrode plate according to claim 1 in which said semipermeable membrane consists essentially of a dried solution of an alkyl polysilicate.

5. An electrode plate according to claim 1 in which said semipermeable membrane consists essentially of a dried solution of said water insoluble high molecular weight organic material and at least one member of the group consisting of said organosilicon compound and said water soluble high molecular organic weight material.

6. An electrode plate according to claim 1 in which said semipermeable membrane consists essentially of a dried solution of an ion-exchange material and at least one member of the group consisting of said water soluble high molecular organic weight material, said water insoluble high molecular weight organic material and said organosilicon compound.

7. An electrode plate according to claim 6 in which said ion-exchange material is sulfonated polystyrene.

8. An electrode plate according to claim 1 in which said semipermeable membrane is composed of at least two separate laminated layers of a dried solution of said film forming substance.

9. An electrode plate according to claim 1 in which said semipermeable membrane is of a thickness of less than $40\mu$.

10. An electrode plate according to claim 1 in which said semipermeable membrane is of a thickness of $0.1\mu$ to $1\mu$.

11. An electrode plate according to claim 1 in which said semipermeable membrane contains said organosilicon compound and is of a thickness of about $0.1\mu$ to about $0.5\mu$.

12. An electrode plate according to claim 1 in which the base is a metal foil of aluminum, tantalum, titanium or niobium, having on its surface an oxide film and in which said semipermeable membrane is on said oxide film.

13. A method of producing an electrode plate for a capacitor which comprises applying to a base which constitutes the electrode at least one liquid selected from the group consisting of (1) an aqueous solution of a water soluble high molecular weight organic material selected from the group consisting of polyvinyl alcohol, polyethylene oxide, methyl cellulose having a methylation degree of 1.6 to 2.0, gelatin and mixtures thereof;

(2) a mixture of an organosilicon compound in an organic solvent said organosilicon compound being selected from the group consisting of polyalkoxy silane, organopolysiloxane and mixtures thereof;

(3) a mixture in an organic solvent of an ion-exchange material and at least one member selected from the group consisting of said organosilicon compound; said water insoluble high molecular weight compound; and a water insoluble high molecular weight organic material selected from the group consisting of nitrocellulose, methyl cellulose having a methylation degree of 2.4 to 2.8, alkali cellulose, acetyl cellulose, polyvinyl chloride, polyacrylonitrile, vinyl chloride-acrylonitrile copolymer and mixtures thereof;

and then drying the thus-coated electrode to form a highly liquid absorbent semipermeable membrane on said electrode.

14. A method according to claim 13 in which said ion exchange material is selected from the group consisting of sulfonated polystyrene, polyvinyl methyl pyridinium bromide, vinyl methyl ether-maleic anhydride copolymer, pyridine and mixtures thereof, which are anion series substances having a quaternary pyridium group, and cation series substances having the sulfonic group and the carbonic group.

15. A method according to claim 13 in which at least one of said solutions of water soluble organic compound and of organosilicon compounds also contains an organic ion exchange material.

16. A method according to claim 13 in which after the application of at least one of said solutions of said water soluble organic compound and said organosilicon compound, the coating thus applied to said electrode plate is treated with a solution of organic ion exchange material.

17. A method according to claim 13 in which at least one application of said solution of said water soluble high molecular weight organic material is made on said base and in addition a mixture of said water insoluble high molecular organic weight material in an organic solvent is applied to said base to form laminated layers of said water soluble and said water insoluble materials.

18. A method according to claim 13 in which said mixture of organosilicon compound is applied to said base and said water insoluble high molecular weight organic compound in an organic solvent is also applied to said base.

19. A method according to claim 13 in which said base is heated after the application of said liquid to dry said liquid and form said semipermeable membrane.

20. A compact capacitor comprising an element containing a negative and positive electrode plates, at least one of said plates having on its surface a water absorbent, thin, semipermeable membrane consisting essentially of film forming substance selected from the group which consists of (1) water soluble high molecular weight organic material selected from the group consisting of polyvinyl alcohol, polyethylene oxide, methyl cellulose having a methylation degree of 1.6 to 2.0, gelatin and mixtures thereof;

(2) organosilicon compound selected from the group consisting of polyalkoxy silane, organopolysiloxane and mixtures thereof;

(3) a water insoluble high molecular weight organic material selected from a member of the group consisting of nitrocellulose, methyl cellulose having a methylation degree of 2.4 to 2.8, alkali cellulose, acetyl cellulose, polyvinyl chloride, polyacrylonitrile, vinyl chloride-acrylonitrile copolymer and mixtures thereof and at least one member selected from the group consisting of said organosilicon compound and said water soluble high molecular weight organic compound;

(4) an ion exchange material and at least one member of the group consisting of said water soluble high molecular weight organic material, said organosilicon compound and said water insoluble high molecular weight organic polymer, wherein said semipermeable membrane is positioned between said positive and negative electrode plates and is the sole spacer therebetween.

21. A compact capacitor according to claim 20 in which said ion exchange material is selected from the group consisting of sulfonated polystyrene, polyvinyl methyl pyridinium bromide, vinyl methyl ether-maleic anhydride copolymer, pyridine and mixtures thereof, which are anion series substances having a quaternary pyridium group, and cation series substances having the sulfonic group and the carbonic group.

22. A compact capacitor according to claim 20 in which said semipermeable membrane is of a thickness of less than $40\mu$.

23. A compact electrolytic capacitor according to claim 20 in which said semipermeable membrane is of a thickness of about $0.1\mu$ to $1\mu$.

24. A capacitor according to claim 20 in which said semipermeable membrane contains said organosilicon compound and is of a thickness of about $0.1\mu$ to about $0.5\mu$.

25. A capacitor according to claim 20 in which said electrode plates are metal foils of aluminum, tantalum, titanium, or niobium at least one of which has an oxide film which serves as the dielectric on its surface and in which said permeable membrane is coated on said oxide film.

26. An electrode plate for an electrolytic capacitor comprising a base which constitutes the electrode and a very thin semipermeable and liquid absorbing membrane on the surface of said base, said membrane consisting essentially of at least one film-forming substance selected from the group which consists of
(1) water soluble high molecular weight organic material selected from the group consisting of polyvinyl alcohol, polyethylene oxide, methyl cellulose having a methylation degree of 1.6 to 2.0, gelatin and mixtures thereof, being capable of forming the semipermeable membrane from aqueous solution;
(2) organosilicon compound selected from the group consisting of polyalkoxy silane, organopolysiloxane and mixtures thereof;
(3) a combination of a water insoluble high molecular weight organic material selected from a member of the group consisting of nitrocellulose, methyl cellulose having a methylation degree of 2.4 to 2.8, alkali cellulose, acetyl cellulose, polyvinyl chloride, polyacrylonitrile, vinyl chlorideacrylonitrile copolymer and mixtures thereof and at least one member selected from the group consisting of said organosilicon compound and said water soluble high molecular weight compounds;
(4) a combination of an ion-exchange material and at least one member of the group consisting of said water soluble high molecular weight material, said organosilicon compound and said water insoluble high molecular weight polymer, and
(5) a combination of said water soluble high molecular weight organic material and said organosilicon compound.

References Cited

UNITED STATES PATENTS

| | | | |
|---|---|---|---|
| 1,918,167 | 7/1933 | Ruben | 317—230 |
| 1,918,717 | 7/1933 | Ruben | 317—230 |
| 2,145,710 | 1/1939 | Clark | 317—230 |
| 2,544,342 | 3/1951 | Miller | 260—398 |
| 2,759,132 | 8/1956 | Ross | 317—230 |
| 3,015,051 | 12/1961 | Robinson | 317—258 |
| 3,098,182 | 7/1963 | Burnham | 317—230 |
| 3,397,085 | 8/1968 | Cariou | 317—258 |

FOREIGN PATENTS

| | | | |
|---|---|---|---|
| 468,270 | 7/1937 | Great Britain | 317—230 |

JAMES D. KALLAM, Primary Examiner

U.S. Cl. X.R.

29—25.41, 570; 317—258